United States Patent [19]

Bauer

[11] Patent Number: 5,074,473
[45] Date of Patent: Dec. 24, 1991

[54] FORAGE TREATMENT, GRANULAR MATERIAL DISTRIBUTOR

[76] Inventor: Francis C. Bauer, 11010 Old County Rd. 15, Plymouth, Minn. 55441

[21] Appl. No.: 539,017

[22] Filed: Jun. 15, 1990

[51] Int. Cl.[5] ........................ A01C 15/04; B05B 15/02

[52] U.S. Cl. .................................... 239/654; 239/105; 239/113

[58] Field of Search ............... 239/654, 655, 650, 689, 239/104, 105, 112, 113, 423, 424, 590

[56] References Cited

U.S. PATENT DOCUMENTS

| | | | |
|---|---|---|---|
| 2,496,504 | 2/1950 | Tarrant | 239/654 |
| 2,712,961 | 7/1955 | Richardson | 239/105 |
| 2,896,571 | 7/1959 | Geertsen | 239/105 |
| 3,096,004 | 7/1963 | Gandrud . | |
| 3,369,760 | 2/1968 | Schaible . | |
| 3,606,097 | 9/1971 | Wall | 239/654 |
| 4,089,441 | 5/1978 | Cole et al. . | |
| 4,186,885 | 2/1980 | Christian . | |
| 4,228,638 | 10/1980 | Rabe et al. . | |
| 4,335,855 | 6/1982 | Staskal et al. | 239/654 |
| 4,562,968 | 1/1986 | Widmer et al. | 239/655 |
| 4,744,520 | 5/1988 | Widmer | 239/654 |
| 4,852,809 | 8/1989 | Davis et al. | 239/654 |

*Primary Examiner*—Andres Kashnikow
*Assistant Examiner*—Karen B. Merritt
*Attorney, Agent, or Firm*—Peterson, Wicks, Nemer & Kamrath

[57] ABSTRACT

A distributor of granular material for the treatment of forage is disclosed including an air manifold suspended by a parallelogram system from a dispenser. The lower ends of the arms of the parallelogram system are pivotably and slideably mounted to the manifold by bolts extending from the air manifold through apertures formed in the arms to allow the air manifold to slide as the metering rate of the dispenser is adjusted. The discharge tubes for the granular material terminate beyond and below the air tubes of the air manifold. The free ends of the air tubes are inwardly radiused to create a protrusion for detecting air flowing in the air tube longitudinally past and around the discharge tube laterally towards the free end of the discharge tube to create a partial vacuum at the free end of the discharge tube to prevent the granular material from clogging the space between the discharge and air tubes. The air inlet of the fan is located intermediate but off center of the first and second air tubes to provide even air flow therethrough. The flowing air including the suspended granular material is dispersed by smooth bore plastic hoses connected intermediate the air tubes and spreaders. In a first form, the spreader is a 90° street plumbing elbow and in an alternate form, the spreader is in the shape of a duct foot including an inlet oriented at an angle in the order of 45° to an impingement plate having upstanding, radially extending and circumferentially spaced, vane plates.

20 Claims, 1 Drawing Sheet

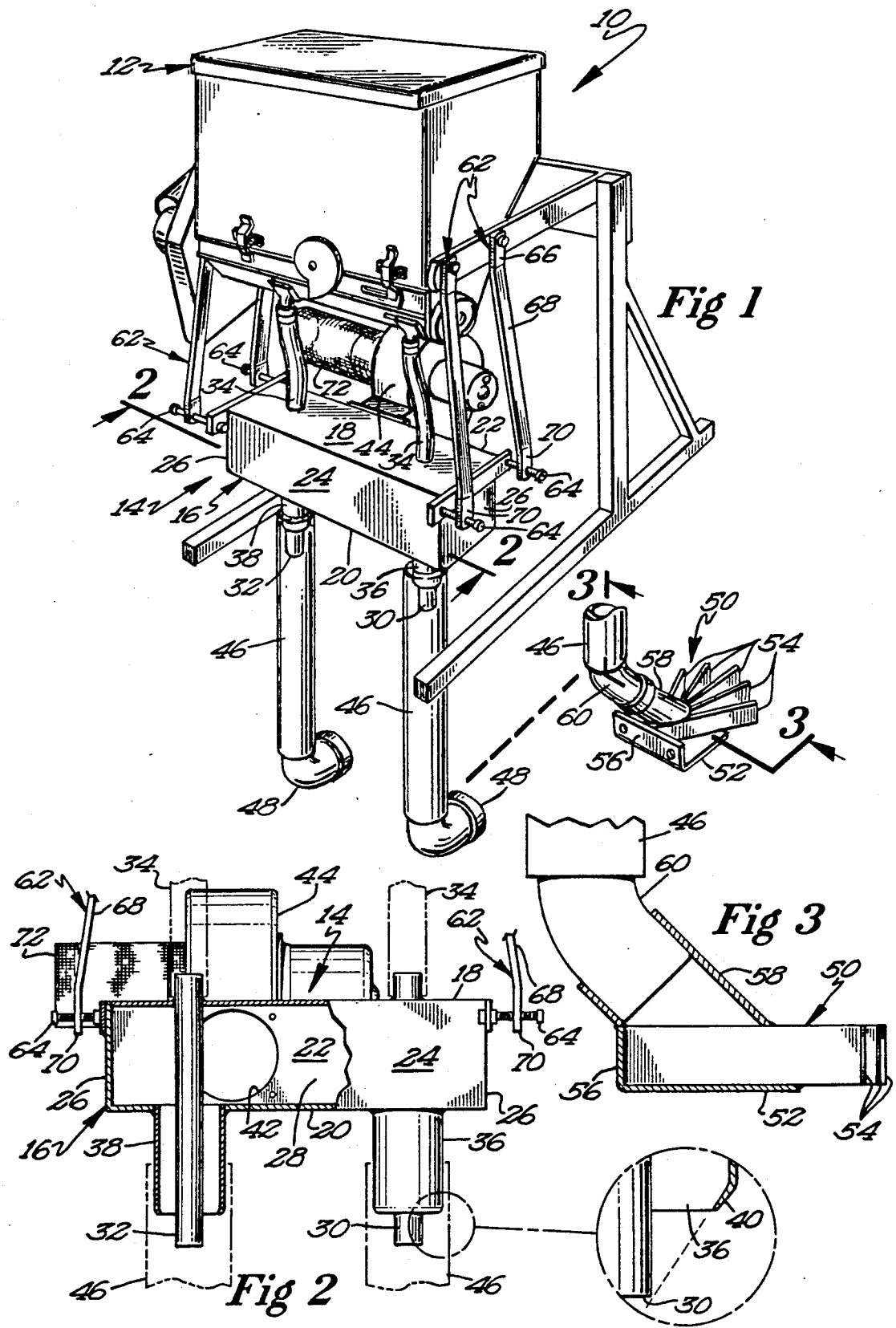

FORAGE TREATMENT, GRANULAR MATERIAL DISTRIBUTOR

BACKGROUND

The present invention generally relates to granular material distributors and particularly to granular material distributors for the treatment of forage, especially forage which is baled in mechanical balers.

The advantages of treatment of forage with inoculants, preservatives, fungicides, additives, and the like typically as granular material such as AGRI-KING ®, SILO-KING ® Forage and Silage Aid is well know. U.S. Pat. No. 4,335,855 shows one type of dry particle distributor for the treatment of forage which has had some commercial success but such success has been severely restricted by several defficiencies including leakage caused by air back pressure, plugging, uneven distribution, and other disadvantages. Thus, a need exists for distributors which overcome the defficiencies of prior distributors and which are otherwise advantageous.

SUMMARY

The present invention solves this need and other problems in the field of forage treatment by providing, in the preferred form and in a first aspect, a distributor including an improved air manifold where air flowing in an air tube and past a granular material discharge tube is directed laterally towards the discharge end of the granular material discharge tube to prevent the granular material from clogging the space between the granular material discharge tube and the air tube.

In another aspect of the present invention, the air manifold is suspended from the dispenser of the distributor by a parallelogram support system including first and second arms having upper ends pivotally mounted about parallel axes to the dispenser and having lower ends pivotally and slideably mounted about parallel axes to the air manifold allowing the air manifold to slide along the lower axes relative to the first and second arms and relative to the dispenser.

It is thus an object of the present invention to provide a novel distributor for granular material.

It is further an object of the present invention to provide such a granular material distributor for use in the treatment of forage.

It is further an object of the present invention to provide such a granular material distributor eliminating leakage caused by air back pressure.

It is further an object of the present invention to provide such a granular material distributor which is not prone to plugging by the granular material.

It is further an object of the present invention to provide such a granular material distributor which evenly distributes the granular material.

It is further an object of the present invention to provide such a granular material distributor allowing adjustment of the rate at which the granular material is metered without the possibility of kinking the hose connecting the dispenser to the air manifold.

It is further an object of the present invention to provide such a granular material distributor which does not require manual removal of leaves, chalf, and the like from the screen of the fan.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 1 shows a perspective view of a granular material distributor for the treatment of forage according to the preferred teachings of the present invention including an alternate spreader assembly exploded therefrom.

FIG. 2 shows a cross-sectional view of the granular material distributor of FIG. 1 according to section line 2—2 of FIG. 1 including an enlarged, encircled area.

FIG. 3 shows a cross-sectional view of the spreader of the granular material distributor of FIG. 1 according to section line 3—3 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "upper", "lower", "end", "side", and similar terms are used herein, it should be understood that these terms have reference only to the structure shown in the drawings as it would appear to a person viewing the drawings and are utilized only to facilitate describing the invention.

DESCRIPTION

A granular material distributor for the treatment of baled forage according to the preferred teachings of the present invention is shown in the drawings and generally designated 10. Generally, distributor 10 includes a granular material dispenser 12 which dispenses a metered amount of granular material under the force of gravity from a hopper. In the most preferred form, a GANDY ® dispenser is utilized, one example of which is shown in U.S. Pat. No. 3,096,004. It can then be appreciated that other types and forms of apparatus may be utilized which meter granular material at the desired rate.

For delivering the granular material metered from dispenser 12 under pressure, an air manifold 14 is utilized in the most preferred form. Specifically, air manifold 14 includes a body 16 having a right, rectangular parallelepiped shape and specifically including a closed top 18, a closed bottom 20, a first closed side 22, a second closed side 24, and first and second closed ends 26, which are planar and attached generally perpendicular to each other to form an interior chamber 28. Manifold 14 further includes first and second, cylindrically shaped air tubes 30 and 32 extending through top 18, chamber 28, and bottom 20. Tubes 30 and 32 receive the metered granular material from dispenser 12 and are connected thereto by any suitable means such as by flexible hoses 34. Manifold 14 further includes first and second, cylindrically shaped air tubes 36 and 38 extending from bottom 20 in air communication with chamber 28 and concentric with tubes 30 and 32, with the diameters of tubes 36 and 38 being larger than the diameters of tubes 30 and 32. The free ends 40 of tubes 36 and 38 are vertically spaced above the free ends of tubes 30 and 32 such that the granular material is discharged by tubes 30 and 32 beyond and below free ends 40 of tubes 36 and 38. Further, a deflecting protrusion formed in the preferred form by inwardly radiusing free ends 40 of tubes 36 and 38 is provided within the annular space between tubes 30, 32, 36 and 38 to direct air passing longitudinally through tubes 36 and 38 past and around tubes 30 and 32 laterally towards or slightly above the lower end of tubes 30 and 32. An air inlet 42 is provided in side 22 intermediate but off center of tubes 36 and 38, and particularly adjacent to tube 38. A suitable fan 44 such as PAR ® Model 34739 - Series flange mounted blower manufactured by ITT JASCO as shown is provided having an outlet providing flowing air into chamber 28 through inlet 42 with sufficient velocity to spread as well as impregnate the granular material into the forage.

Smooth bore plastic hoses 46 are slideably received on the outer surfaces of tubes 36 and 38 and extend downwardly in fluid communication with a spreader 48 for dispersing the flowing air and suspended granular material. In the first preferred form, spreader 48 is in the form of a 90° street plumbing elbow which is slideably received in hoses 46. Specifically, in use with a conventional, mechanical plunger type baler, not shown, distributor 10 is mounted on the end of the pickup opposite to the plunger and with hoses 46 extending over the vertical surface of the pickup, with spreaders 48 directing the granular material at an angle to the path of the crossover teeth of the pickup and towards the plunger.

In use with a conventional rotary hay baler, not shown, where a wider distribution pattern is desired, spreader 50 having a duck foot-shape is utilized. Specifically, spreader 50 includes a generally horizontal impingement plate 52. A plurality of radially extending, circumferentially spaced, vane plates 54 extend perpendicularly from plate 52 and extend beyond an edge thereof for separating and directing the granular material radially outward. The opposite ends of plates 54 terminate in a back plate 56 upstanding generally perpendicularly from the opposite edge of plate 52. An air inlet 58 is positioned in front of plate 56 and over plate 52 at an angle in the order of 45° thereto. Air inlet 58 is in fluid communication with hoses 46 by a 135° street plumbing elbow 60. Spreader 50 may also be utilized in a conventional, mechanical plunger type baler by placing spreader 50 in front of the pickup and for blowing the granular material into the face of the pickup such that it is incorporated in the forage before the forage enters the bale chamber.

The spouts of dispenser 12 of the particular GANDY® dispensers utilized and to which hoses 34 are attached move laterally when the rate at which the granular material is metered is changed. In the most preferred form, air manifold 14 is supported from dispenser 12. To prevent kinking of hoses 34, distributor 10 further includes a unique system for mounting manifold 14. Specifically, each side of air manifold 14 is suspended from dispenser 12 by a parallelogram system including first and second arms 62 having upper ends pivotally mounted to each end of dispenser 12 at spaced locations and lower ends pivotally mounted to each end 26 of manifold 14 at spaced locations. In the preferred form, elongated bolts 64 extend from manifold 14 in a spaced, parallel manner from manifold 14. The lower ends of arms 62 include apertures for slideable receipt on bolts 64 to allow sliding of manifold 14 relative to arms 62. As the width of manifold 14 between ends 26 is generally equal to the width between the ends of dispenser 12, arms 62 include a bend to allow the ends of arms 62 pivotally mounted to bolts 64 to be spaced wider than dispenser 12 and manifold 14. Specifically, arms 62 include a first straight portion 66 extending generally parallel to the ends of dispenser 12 and terminating below the hopper of dispenser 12 in a second, straight portion 18 extending contiguously at an acute angle outwardly from first portion 66. Portion 68 in turn terminates contiguously in a third, straight portion 70 extending generally parallel to ends 26 of manifold 14 and to first portion 66. The apertures through which bolts 64 are slideably received are located in third portions 70. It can be appreciated that portions 70 of arms 62 on opposite sides of manifold 14 are spaced a distance greater than the width of dispenser 12 and of manifold 14. It can be further appreciated that when the metering rate of dispenser 12 is varied moving the spouts thereof, manifold 14 suspended by arms 62 may be moved by sliding bolts 64 within arms 62 until tubes 30 and 32 are positioned in line with the spouts of dispenser 12 such that hoses 34 are not kinked.

Now that the basic construction of distributor 10 has been set forth, further subtle features and advantages of distributor 10 according to the preferred teachings of the present invention can be set forth in comparison to the prior distributor of the type shown and described in U.S. Pat. No. 4,335,855. Specifically the corrugated hose and the distributor nozzle of U.S. Pat. No. 4,335,855 creates an air back pressure causing leakage of dry particles in the hose connections with the manifold and the hopper and from the hopper itself. In addition to being wasteful of the dry particles, the dry particles which leak collect upon the baler and distributor itself. This back pressure is eliminated in distributor 10 according to the teachings of the present invention. Specifically, hoses 46 as well as spreader 48 and elbow 60 having smooth, internal bores eliminate the flow restriction created by the corrugated hoses of U.S. Pat. No. 4,335,855, with such flow restriction in turn creating the undesirable back pressure.

Further, as the splash surface is oriented at 90° to the axis of the focusing vent of U.S. Pat. No. 4,335,855, the flow of air including the dry particles is also restricted in turn creating the undesirable back pressure. According to the preferred teachings of the present invention, inlet 58 is oriented at a 45° angle to the impingement plate 52 such that flow of air including the granular material is not restricted in a manner to create undesirable back pressure.

It can then be appreciated that elimination of undesirable back pressure by distributor 10 according to the preferred teachings of the present invention also eliminates the leakage problems associated with prior distributors. Further, vane plates 54 of spreader 50 also help insure that the granular material passing through inlet 58 is evenly radially distributed by spreader 50.

Likewise, the blender of U.S. Pat. No. 4,335,855 was prone to plugging or clogging in the space adjacent and between the free ends of the air tube and the particulate material discharge tube because the particulate material is discharged substantially at the free end of the air tube or in other words substantially at the constricted area defined by the air tube and particulate material discharge tube. According to the preferred teachings of the present invention, tubes 30 and 32 do not terminate in air tubes 36 and 38 of manifold 14 but terminate in hoses 46 below the constricted area formed and defined between tubes 30, 32, 36, and 38 of manifold 14. Further, free ends 40 of tubes 36 and 38 are radiused such that air flowing through tubes 36 and 38 is forced radially inwardly as it flows longitudinally past ends 40 of tubes 36 and 38 and particularly such that air is directed towards or slightly above the free ends of tubes 30 and 32. It has been found that air being forced radially inwardly towards the outlet end of tubes 30 and 32 spaced longitudinally downwind of the protrusion formed by radiusing free ends 40 creates a partial vacuum at the discharge end of tubes 30 and 32 providing a washing or cleaning type action to prevent granular material from plugging up the annular, constricted area between tubes 30, 32, 36, and 38 as occurred in U.S. Pat. No. 4,335,855.

Further, with the fan providing air through an end of the manifold as in U.S. Pat. No. 4,335,855, the rates of air flow through the air tubes are not the same causing different distribution pattern through the first and second distributor nozzles. Different distribution patterns are undesirable as the dry particles will not be evenly distributed in the forage. In manifold 14 according to the teachings of the present invention, air inlet 42 is located in side 22 intermediate air tubes 36 and 38. Further, to obtain even air flow through tubes 36 and 38, air inlet 42 is located off center of tubes 36 and 38. With this arrangement, even air flow occurs through tubes 36 and 38 creating even distribution patterns of granular material through spreaders 48 or 50 and onto the forage as it enters the mechanical baler. Mounting of fan 44 to side 22 is also advantageous as it allows the use of a cylindrical screen 72 positioned over the input of fan 44 and with cylindrical screen 72 being generally located within the confines of dispenser 12. Particularly, cylindrical screen 72 allows leaves, chalf, and the like which are held by screen 72 and prevented from entering fan 44 to fall under the force of gravity when power to fan 44 is turned off. On the other hand, leaves, chalf, and the like tend not to fall from the vertical, planar screen provided on the fan of U.S. Pat. No. 4,335,855, requiring manual removal.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a distributor of granular material including an air manifold having at least a first granular material discharge tube extending within a first air tube, with the granular material discharge tube being in communication with a source of metered granular material and having a discharge end for discharging the granular material, and with the air tube in communication with a source of flowing air, the improvement comprising an improved air manifold comprising, in combination: means located in the space between the granular material discharge tube and the air tube for directing the air flowing in the air tube longitudinally past the granular material discharge tube laterally towards the discharge end of the granular material discharge tube to prevent the granular material from clogging the space between the granular material discharge tube and the air tube, wherein the directing means comprises a protrusion formed in the air tube.

2. The distributor of claim 1 wherein the air tube has a free end; and wherein the granular material discharge tube extends beyond and discharges the granular material beyond the free end of the air tube.

3. The distributor of claim 2 wherein the granular material discharge tube is cylindrical in shape; wherein the air tube is cylindrical in shape and has a diameter larger than the diameter of the granular material discharge tube; and wherein the granular material discharge tube is located concentrically within the air tube.

4. The distributor of claim 3 wherein the protrusion is formed by providing a radius to the free end of the air tube.

5. The distributor of claim 1 wherein the source of metered granular material comprises a dispenser including at least a first spout connected to the end of the granular material discharge tube opposite to the discharge end by a hose; and wherein the air manifold is suspended from the dispenser by a parallelogram support system comprising, in combination: a first arm having an upper end and a lower end; a second arm having an upper end and a lower end; means for pivotally mounting the upper ends of the first and second arms to the dispenser about first and second, spaced, parallel axes; means for pivotally and slideably mounting the lower ends of the first and second arms to the air manifold about third and fourth, spaced, parallel axes, with the first, second, third and fourth axes being parallel and spaced.

6. The distributor of claim 5 wherein the pivotally and slideably mounting means comprises, in combination: a first bolt extending from the air manifold along the third axis; a second bolt extending from the air manifold along the fourth axis, with the first bolt being pivotably and slideably received in the lower end of the first arm, and with the second bolt being pivotably and slideably received in the lower end of the second arm.

7. The distributor of claim 1 wherein the protrusion is formed by providing a radius to the free end of the air tube.

8. In a distributor of granular material, an improved manifold comprising, in combination: a first granular material discharge tube extending within a first air tube; a second granular material discharge tube extending within a second air tube; a closed body having a right, rectangular parallelepiped shape and including a top, a bottom, a first side, a second side, a first end, and a second end, with the first and second granular material discharge tubes extending through the top and the bottom, with each of the granular material discharge tubes being in communication with a source of metered granular material and having a discharge end for discharging the granular material, with the first and second air tubes extending from the bottom and in communication with the body; and an air inlet formed in the first side and in communication with a source of flowing air, with the air inlet located intermediate but off center between the first and second air tubes to provide even air flow through the first and second air tubes.

9. A distributor of granular material comprising, in combination: an air manifold having at least a first granular material discharge tube extending within a first air tube, with the granular material discharge tube being in communication with a source of metered granular material and having a discharge end for discharging the granular material; a fan having an inlet and an outlet in communication with the air tube; and a cylindrical shaped screen positioned over the inlet of the fan.

10. A distributor of granular material comprising, in combination: an air manifold having at least a first granular material discharge tube extending within a first air tube, with the granular material discharge tube being in communication with a source of metered granular material and having a discharge end for discharging the granular material, and with the air tube in communication with a source of flowing air; and means in communication with the air tube for dispersing the flowing air and suspended granular material, with the dispersing means including a smooth, internal bore for eliminating restrictions to the flow of air and granular material.

11. The distributor of claim 10 wherein the dispersing means comprises, in combination: a smooth bore plastic hose slideably received on the air tube; and a spreader, with the hose being slideably received on the spreader.

12. The distributor of claim 11 wherein the spreader comprises a 90° street plumbing elbow.

13. The distributor of claim 11 wherein the spreader comprises, in combination: a generally horizontal impingement plate; a spreader inlet arranged at an angle in the order of 45° to the impingement plate, with the spreader inlet being in communication with the smooth bore plastic hose; and means on the impingement plate for separating and directing the granular material and air radially outwardly.

14. The distributor of claim 13 wherein the separating and directing means comprises vane plates secured generally perpendicular to the impingement plate and extending radially outwardly and circumferentially spaced from each other.

15. The distributor of claim 14 wherein the spreader further comprises, in combination: a 135° street plumbing elbow, with the elbow being slideably received on the spreader inlet, and with the smooth bore plastic hose being slideably received on the elbow.

16. In a distributor of granular material including a dispenser and an air manifold, with the dispenser being in granular material communication with the air manifold by a hose, the improvement comprising a parallelogram support system comprising, in combination: a first arm having an upper end and a lower end; a second arm having an upper end and a lower end; means for pivotally mounting the upper ends of the first and second arms to the dispenser about first and second, spaced, parallel axes; means for pivotally and slideably mounting the lower ends of the first and second arms to the air manifold about third and fourth, spaced, parallel axes, with the first, second, third and fourth axes being parallel and spaced.

17. The distributor of claim 16 wherein the pivotally and slideably mounting means comprises, in combination: a first bolt extending from the air manifold along the third axis; a second bolt extending from the air manifold along the fourth axis, with the first bolt being pivotably and slideably received in the lower end of the first arm, and with the second bolt being pivotably and slideably received in the lower end of the second arm.

18. The distributor of claim 17 wherein the width of the dispenser and air manifold are generally the same; and wherein the first and second arms comprise, in combination: a first, straight portion including the upper end and extending generally parallel to the dispenser; a second, straight portion extending outwardly at an obtuse angle contiguously from the first, straight portion; and a third, straight portion including the lower end and extending generally parallel to the air manifold and to the first, straight portion and extending contiguously from the second, straight portion.

19. A distributor of granular material comprising, in combination: an air manifold having at least a first granular material discharge tube extending within a first air tube, with the granular material discharge tube being in communication with a source of metered granular material and having a discharge end for discharging the granular material, and with the air tube in communication with a source of flowing air; and a spreader in communication with the air tube for dispersing the flowing air and suspended granular material, with the spreader comprising, in combination: a generally horizontal impingement plate; a spreader inlet arranged at an angle in the order of 45° to the impingement plate, with the spreader inlet being in communication with the air tube; and means on the impingement plate for separating and directing the granular material and air radially outwardly.

20. The distributor of claim 19 wherein the spreader further comprises, in combination: a 135° street plumbing elbow, with the elbow being slideably received on the spreader inlet, and with the elbow being in communication with the air tube.

* * * * *